US006553388B1

United States Patent
Perks

(10) Patent No.: US 6,553,388 B1
(45) Date of Patent: Apr. 22, 2003

(54) DATABASE DELTAS USING CYCLIC REDUNDANCY CHECKS

(75) Inventor: Michael Albert Perks, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 09/620,726

(22) Filed: Jul. 20, 2000

(51) Int. Cl.[7] .............................................. G06F 17/30
(52) U.S. Cl. ...................................................... 707/201
(58) Field of Search ............................... 707/1, 4, 201, 707/203; 705/4, 54

(56) References Cited

U.S. PATENT DOCUMENTS

| | | | | |
|---|---|---|---|---|
| 4,849,978 A | | 7/1989 | Dishon et al. ................. | 371/51 |
| 5,261,092 A | | 11/1993 | McLaughlin ................. | 395/600 |
| 5,479,654 A | * | 12/1995 | Squibb ......................... | 707/201 |
| 5,613,002 A | | 3/1997 | Kephart et al. ................ | 380/4 |
| 5,649,089 A | | 7/1997 | Kilner .................... | 395/182.04 |
| 5,974,574 A | | 10/1999 | Lennie et al. .................. | 714/52 |
| 6,014,676 A | * | 1/2000 | McClain ........................ | 705/4 |
| 6,101,507 A | * | 8/2000 | Cane et al. ................. | 707/201 |
| 6,219,818 B1 | * | 4/2001 | Freivald et al. ................ | 707/1 |
| 6,233,589 B1 | * | 5/2001 | Balcha et al. ............... | 707/203 |
| 6,393,438 B1 | * | 5/2002 | Kathrow et al. .............. | 705/54 |

FOREIGN PATENT DOCUMENTS

WO    WO9745786 A1    12/1987    ............. G06F/7/20

OTHER PUBLICATIONS

IBM Technical Disclosure Bulletim Vo. 32, No. 11, Apr. 1990.

* cited by examiner

Primary Examiner—Diane D. Mizrahi
Assistant Examiner—Yicun Wu
(74) Attorney, Agent, or Firm—David A. Mims, Jr.; Rudolf O. Siegesmund

(57) ABSTRACT

A method for determining what records have been added, deleted or changed in a database uses primary keys and CRCs to make the determination. A first snapshot is taken of a record, the record retrieved, converted into characters, if necessary, and concatenated to produce a long string. A CRC code is calculated for the string. The CRC and the primary key for the record are stored. The CRC is compared with a subsequent CRC for a second snapshot of the record and a subsequent primary key. Comparing the two primary keys and the two CRCs allows determination of whether the record has been deleted, added or changed. If the first and second primary keys do not match, or if the first and second primary keys match and the CRCs do not match, the record is processed according to the particular application to be applied. The process is repeated for all records in the database.

19 Claims, 2 Drawing Sheets

DATABASE DELTAS USING CYCLIC REDUNDANCY CHECKS

FIELD OF THE INVENTION

The present invention relates to a solution to the problem of recognizing what records have been changed in a database using a Cyclic Redundancy Check (CRC).

BACKGROUND OF THE INVENTION

The problem of recognizing what has changed in a database arise in three general situations. First, multiple databases may exist in a system requiring the same data in each. Therefore, if a change is made, the fact that a change has taken place must be recognized and the changed record transferred to the other databases. Second, an unauthorized change to a record may take place. Malicious software, commonly called viruses, change records in ways that are designed to conceal the change. Therefore, changed records must be identified for elimination of the virus and restoration of the attacked record. Third, it may be necessary to migrate data from a legacy data base in an old format base into a new data base in a new format. Because of the volume of data that may exist in the legacy data base, the time necessary for the migration can disrupt the user's business activity. Therefore, the records in the legacy data base can be transferred to the new data base and the new format prior to the changeover, and then it only remains to migrate the changed, added or deleted records from the period between the creation of the new data base and the changeover. In other words, if the old data base was migrated into the new data base and format one month before the business was to start using the new database, only the changes that occurred in the one month need to be processed prior to the changeover, and that can be done in a shorter time, thereby eliminating a lengthy disruption of the user's business activity.

In the first two situations described above, Cyclic Redundancy Checks (CRCs) have been used to identify changes in the database. As used herein CRCs mean a redundancy check in which the check key is generated by a cyclic algorithm. CRCs are used to verify database synchronization. Synchronization means, in application or data-base files, making version comparisons of copies of the files to ensure they contain the same data. U.S. Pat. No. 5,261,092 discloses verifying that two databases are synchronized. The '092 patent discloses a method for verifying data base information of redundant processors, and more particularly, for verifying that the data base of a primary processor and the data base of a secondary processor are synchronized without requiring the processors to be running in a synchronous manner.

A checksum is a form of CRC. As used herein a checksum means the sum of a group of data associated with the group and used for checking purposes. The data are either numeric or other character strings regarded as numeric for the purpose of calculating the checksum. The checksum is a calculated value that is used to test data for the presence of errors that can occur when data is transmitted or when it is written to a disk. The checksum is calculated for a given amount of data by sequentially combining all the bytes of data with a series of arithmetic or logical operations. After the data is transmitted or stored, a new checksum is calculated in the same way using the (possibly faulty) transmitted or stored data. If the two checksums do not match, an error has occurred, and the data should be transmitted or stored again. Checksums cannot detect all errors, and they cannot be used to correct erroneous data. U.S. Pat. No. 4,849,978 discloses the use of a checksum to recreate memory data. In a system having "n" memory units, an additional memory unit is added to serve as a backup. The backup data stored in the backup memory unit consists of the checksum of all data stored in all other memory units such that a word at address x in the backup unit is the checksum of all words at address x of all other memory units.

U.S. Pat. No. 5,974,574 discloses using a checksum to verify the credibility of a database. The method disclosed includes forming a position sensitive checksum for each entry of the database to be used in the check. The checksums are then formed into a first database checksum. Periodically, the checksums are again created from each of the entries, and a second database checksum formed and compared to the first. A match indicates that the checked entries of the database have not changed. In another embodiment, the checksum value for a modified entry, and for the entry before the modification are compared with the first checksum value, and that result compared with the master checksum to ensure that the modification was properly made and that database remains credible.

U.S. Pat. No. 5,613,002 discloses using a checksum to verify a reconstructed database. The invention of the '002 is directed toward an improved method of "generic disinfection". By generic disinfection is meant the use of a small amount of information about each host program in a database, and the use of that information to reconstruct the original program. Specifically, the '002 patent discloses a method of recording certain information about a computer program, and for using that information to reconstruct the program in the event that it subsequently becomes infected with any of a very broad class of viruses. The method includes constructing a database with entries for each program to be protected. It further includes a fast trial-and-error method for constructing the original uninfected host based on cyclical redundancy checks (CRCs), or a broader class of linear modular-arithmetic mappings. The method is founded on the observation that, for virtually every known virus, the infected host contains no more than two contiguous blocks of code taken from the original uninfected host (and possibly reversed in order). Prior to the infection, a "checksum" (a many-to-one bit mapping of the bytes comprising the uninfected host to a small number of bits or bytes) is computed. In addition, information pertaining to bytes near the beginning and end of the host is computed (designated Begin Tag and End Tag, respectively). Furthermore, the length of the host is determined. The checksum, Begin Tag, End Tag and filelength are recorded in a database containing one or more such entries, one for each host. The '002 patent uses the checksum, Begin Tag, End Tag and filelength to reconstruct the original host if it is subsequently determined that the program has changed in a suspicious manner. The '002 patent begins with an infected host and does not address detection of the infection.

U.S. Pat. No. 5,649,089 discloses, for a redundant, mirror database, using a checksum to assure that the standby database mirrors the active database. The disclosure deals with the real time tracking of change to a data base within a data communication system and more particularly to the maintenance of a redundant database in such systems. The active database includes a plurality of records each of which is subject to modifications from time to time. Those modifications must be communicated to and copied or mirrored in the standby database. In order to achieve the redundant controller system, a central processor modifies a record which includes a record checksum and incorporates the record checksum for the active data base. The active controller communicates the record, including the record checksum, and record number to the standby controller for incorporation into the standby database and concurrently constructs a virtual checksum. The virtual checksum is the checksum the active controller expects the standby database to have after the incorporation of the record being communicated. In this fashion, the active controller may continue making record modifications as required, reflected in the active checksum, and provide record updates, in a compatible timescale, to the standby data base, and yet retain the ability to compare, periodically the standby checksum to the virtual checksum, thus insuring that the standby data base mirrors the active data base.

What is needed beyond the prior art is a simplified extension to using CRCs to determine what has been changed in a database.

SUMMARY OF THE INVENTION

The invention which meets the needs identified above is a method for determining what records have been added, deleted or changed in a database utilizing primary keys and CRCs to make the determination. A first snapshot is taken of a record, the record retrieved, converted into characters, if necessary, and concatenated to produce a long string. A CRC code is calculated for the string. The CRC and the primary key for the record are stored. The CRC is compared with a subsequent CRC for a second snapshot of the record and a corresponding primary key. Comparing the two primary keys and the two CRCs allows determination of whether the record has been deleted, added or changed. If the first and second primary keys do not match, or if the first and second primary keys match and the CRCs do not match, the record is processed according to the particular application to be applied. The process is repeated for all records in the database.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
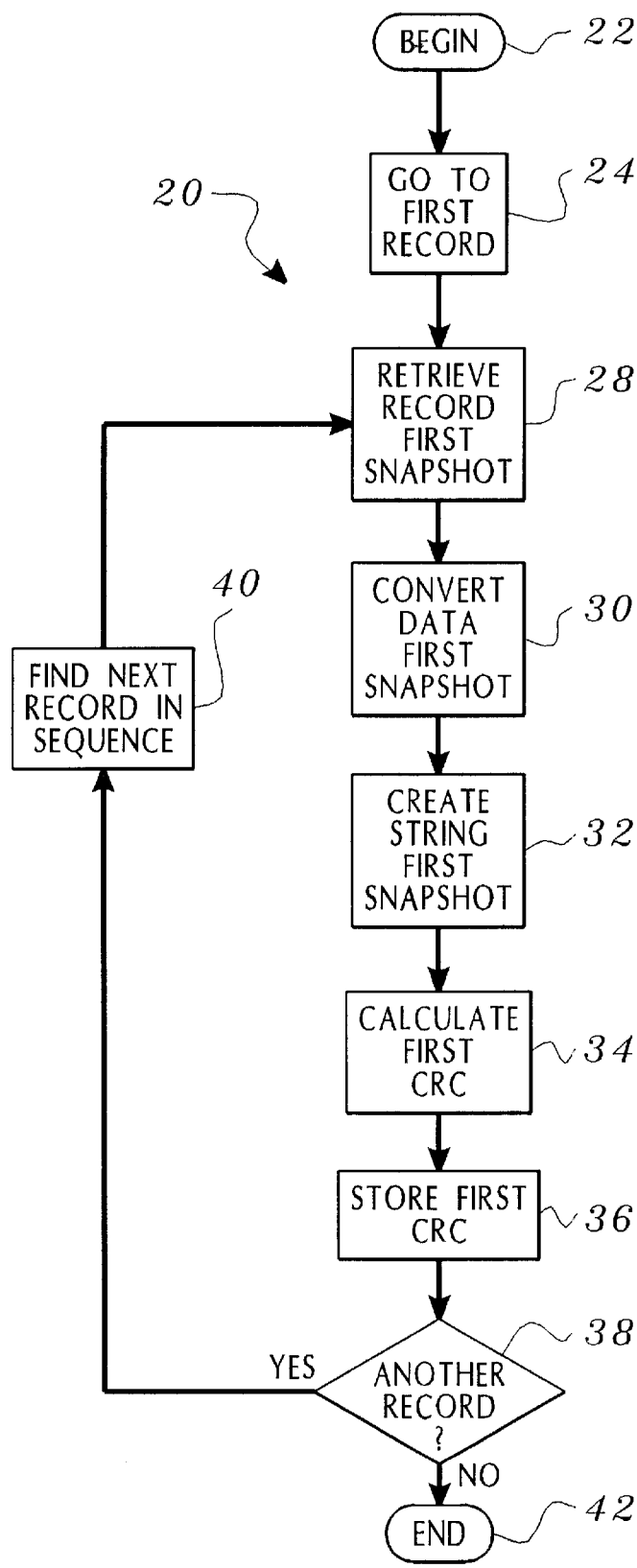
FIG. 1 is a flow chart of the first snapshot process.

Referring to FIG. 1 a flow chart of first snapshot program 20 is shown. In the preferred embodiment, the administrator (or user) invokes program 20 to cause the computer to take a first snapshot of all records in a database. First, program 20 goes to the first record (24) and retrieves the record and takes a first snapshot of the record (28). As used herein the term "snapshot" means a copy of a record in a memory at a given instant that is sent to another memory or memory location. Next, the data in the record is converted into characters (30). As used herein, the term character means a letter, digit, or other symbol that is used as part of the organization, control, or representation of data. Next, a string is created from the groups of characters which represent the fields of the record (32). As used herein, the term "string" means a sequence of characters of the same nature. The string is created by concatenating the groups of characters. As used herein, the term "concatenate" means to link together or join two or more strings of characters. If required, a special character may be used to serve as a field separator between the groups of records. For the string which has been created, the program calculates a Cyclic Redundancy Check (CRC) (34). The CRC may be 16 bit or 32 bit. The programmer may elect a 32 bit CRC in order to minimize the chances of two identical CRCs being created when the records are actually different. The calculated CRC for the first snapshot is stored in non-volatile memory such as a disk, hard drive or database (36). The primary key for the record is also stored with the CRC for the record. As used herein, a primary key is a key that unambiguously identifies a record. The program then determines whether there is another record to be processed. If there is another record to be processed, the program finds the next record in sequence (40). After the program finds the next record in sequence, the program returns to step 28 and retrieves the record and takes the first snapshot for the next record. The program continues to cycle through the following steps until there are no more records to be processed. If there is not another record to be processed, the program ends (42).

Figure 2:
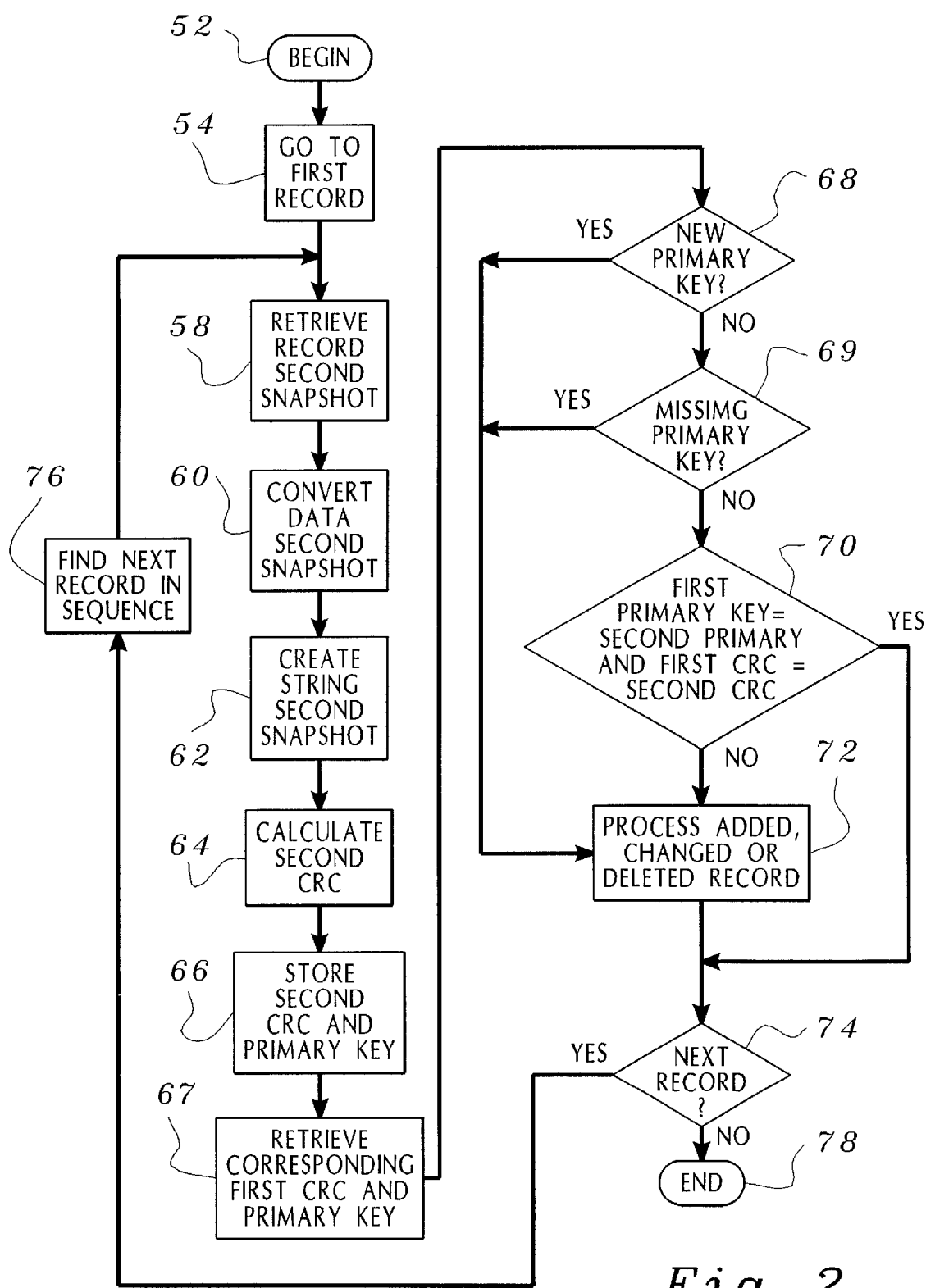
FIG. 2 is a flow chart of the second snapshot and comparison process.

Referring to FIG. 2, the administrator may invoke the program at a point in time after the first CRCs have been calculated and stored in non-volatile memory in order to calculate a second set of CRCs. For example, the administrator may have previously transferred a legacy data base from an old format to a new data base and new format and now desires to update the new data base with the latest changes from the legacy data base before running applications on the new data base. The administrator invokes the second CRC program 50. The program goes to the first record in sequence to be examined (54) and retrieves the record and takes a second snapshot of the record (58). Next, the data in the record is converted into characters (60). A string is created from the groups of characters which represent the fields of the record (62). The string is created by concatenating the groups of characters. If required, a special character may be used to serve as a field separator between the groups of records. For the string which has been created, the program calculates a 16 bit or 32 bit Cyclic Redundancy Check (CRC) (64). The calculated CRC for the second snapshot and the primary key for that record are stored in memory, which may be volatile or non volatile (66). The program then retrieves the corresponding first CRC and primary key (67). If a new primary key appears, then that record has been added (68) and the program goes to step 72. If a primary key from the first snapshot database does not appear in the second snapshot database (69), then that record has been deleted and the program goes to step 72. If the primary key from the first snapshot database is the same as a primary key from the second snapshot database, the first CRC and the second CRC are compared (70). If the first primary key and the second primary key are the same and if the first CRC does not equal the second CRC, then the record has been changed and the program goes to step 72. For example, if there are three records in the legacy database and the primary keys and CRCs for those three records in the first snapshot database are as follows: A,22; B,26; C,92. When the second CRC program is invoked, the following primary keys and CRCs are found: A,22; B,35; D,59. Since the record with primary key A reappears, the record has not been added or deleted. Since the CRC is the same, the record has not been changed. For the second record, the primary key has not changed; however, the CRC has changed. Therefore, the second record has been changed. The third record in the legacy database has the primary key C. It does not appear in the second snapshot database. Therefore, the third record in the legacy database has been deleted. The third record in the second snapshot database has the primary key D. The primary key D did not appear in the legacy database; therefore, the record has been added. Therefore, the program searches for missing primary keys. Those records are identified as being deleted. The program searches for new primary keys. Those records are identified as being added. When the primary keys match, the CRCs are compared. If the first CRC equals the second CRC, then the process will go to step 74 and determine if another record is to be processed. The records will be processed according to the specific needs of the applications to be used with the database. If another record is to be processed, the program will find the next record in sequence (76) and go to step 58. If there is not another record to be processed, the program will end (78). The administrator will then have identified the records that have been added, changed, or deleted from the legacy database. In an alternate embodiment, all of the CRCs for the second snapshot are processed and stored prior to beginning the comparison with the first CRCs.

The advantages provided by the present invention should be apparent in light of the detailed description provided above. The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed:

1. A method for identifying added, deleted or changed records in a database comprising the steps of:
    taking a first snapshot of each of the records of a database at a first point in time;
    calculating a first CRC for the record;
    storing the first CRC and a first primary key for the record;
    taking a second snapshot of each of the records of the database at a second point in time;
    calculating a second CRC for the record at the second point in time;
    storing the second CRC and a second primary key for the record;
    comparing the first CRC to the second CRC and comparing the first primary key to the second primary key to determine whether the record has been changed;
    wherein said primary key unambiguously identifies a single said record among a plurality of said records and said primary key is stored in conjunction with said first CRC and said second CRC; and
    wherein the comparison of the first CRC with the second CRC and the comparison of the first primary key with the second primary key determines the specific location and nature of an addition, deletion, or change to the record in the database.

2. The method of claim 1 further comprising be step of:
    responsive to a finding a primary key from the first snapshot that does not appear in the second snapshot, identifying the record corresponding to that primary key as a record that has been deleted and notifying a user of said deletion in said record identified by said primary key.

3. The method of claim 1 further comprising the step of:
    responsive to finding a primary key in the second snapshot that did not appear in the first snapshot, identifying that record as a record that has been added and notifying a user of said addition in said record identified by said primary key.

4. The method of claim 1 wherein the step of calculating a first CRC comprises:
    retrieving the record;
    converting the data in the record into characters;
    creating a string from the characters;
    calculating a first CRC from the string; and
    storing the first CRC in non-volatile memory such as disk, hard drive or data base.

5. The method of claim 1 where the step of calculating a second CRC comprises:
    retrieving the record;
    converting the data in the record into characters;
    creating a string from the characters;
    calculating a second CRC from the string; and
    storing the second CRC in memory.

6. The method of claim 1 further comprising, responsive to a determination that the first CRC and the second CRC are the same, proceeding to the next record.

7. A programmable apparatus for identifying added, changed or deleted records in a database comprising:
    programmable hardware comprising:
        a computer having a processor and a non-volatile memory such as disk, hard drive or data base;
        a plurality of records installed on said memory;
        a program installed on said computer for causing said computer to take a first snapshot of each record in a database and for each record, to retrieve the record, to convert the data in the record into characters to create a string from the characters, to calculate a first CRC from the string, and to store the first CRC and primary key in non-volatile memory such as disk, hard drive or data base;
        responsive to a command at a later time, causing the computer to take a second snapshot of each record in the database, and for each record to retrieve the record, to convert the data in the record into characters, to create a string from the characters, to calculate a second CRC from the string, and to store the second CRC and primary key in memory;
        wherein, responsive to comparing the first CRC to the second CRC and comparing the first primary key to the second primary key to determine whether the record has been changed;
        wherein said primary key unambiguously identifies a single said record among a plurality of said records and said primary key is stored in conjunction with said first CRC and said second CRC; and
        wherein the comparison of the first CRC with the second CRC and the comparison of the first primary key with the second primary key determines the specific location and nature of an addition, deletion, or change to the record in the database.

8. The programmable apparatus of claim 7 further comprising:
    responsive to finding a primary key from the first snapshot that does not appear in the second snapshot, identifying the record corresponding to that primary key as a record that has been deleted and notifying a user of said deletion in said record identified by said primary key.

9. The programable apparatus of claim 7 further comprising:

responsive to finding a primary key the second snapshot that did not appear in the first snapshot, identifying that record as a record that has been added and notifying a user of said addition in said record identified by said primary key.

10. A computer readable memory for causing a computer to identify added, deleted or changed records in a database comprising:

a first computer readable storage medium;

a computer program stored in said storage medium; and the storage medium, so configured by said computer program causes the computer to take a first snapshot and a second snapshot of said records, and to compare the first snapshot to the second snapshot and comparing a first primary key to a second primary key to determine whether the record has been changed;

wherein said primary key unambiguously identifies a single said record among a plurality of said records and said primary key is stored in conjunction with a first CRC and a second CRC; and wherein the comparison of the first snapshot with the second snapshot and the comparison of the first primary key with the second primary key determines the specific location and nature of an addition, deletion, or change to the record in the database.

11. The computer readable memory of claim 10 further comprising said computer readable memory causing the computer to take a first snapshot of each record in a database and for each record, to retrieve the record, to convert the data in the record into characters, to create a string from the characters, to calculate a first CRC from the string, and to store the first CRC and primary key in non-volatile memory such as disk, hard drive or data base;

and responsive to a command at a later time, causing the computer to take a second snapshot of each record in the database, and for each record to retrieve the record, to convert the data in the record into characters, to create a string from the characters, to calculate a second CRC from the string, and to store the second CRC and primary key in memory; and wherein, responsive to comparing said first CRC and said second CRC for a record with the same primary key in the first snapshot and in the second snapshot, determining whether that record has been changed.

12. The computer readable memory of claim 10 further comprising:

responsive to a finding a primary key from the first snapshot that does not appear in the second snapshot, identifying the record corresponding to that primary key as a record that has been deleted and notifying a user of said deletion in said record identified by said primary key.

13. The computer readable memory of claim 10 further comprising:

responsive to finding a primary key in the second snapshot that did not appear in the first snapshot, identifying that record as a record that has been added and notifying a user of said addition in said record identified by said primary key.

14. The method of claim 1 wherein said comparing further comprises:

responsive to a finding that said primary key of said first snapshot matches said primary key of said second snapshot, comparing said first CRC and said second CRC and upon a determination that said first CRC and said second CRC are different, notifying a user that a revision has been made to said record identified by said primary key.

15. The apparatus of claim 7 wherein said comparing further comprises:

responsive to a finding that said primary key of said first snapshot matches said primary key of said second snapshot, comparing said first CRC and said second CRC and upon a determination that said first CRC and said second CRC are different, notifying a user that a revision has been made to said record identified by said primary key.

16. The apparatus of claim 10 wherein said comparing further comprises:

responsive to a finding that said primary key of said first snapshot matches said primary key of said second snapshot, comparing said first CRC and said second CRC and upon a determination that said first CRC and said second CRC are different, notifying a user that a revision has been made to said record identified by said primary key.

17. The method of claim 1 when said first snapshot is of a legacy database and said second snapshot is of a converted database.

18. The apparatus of claim 7 wherein said first snapshot is of a legacy database and said second snapshot is of a converted database.

19. The apparatus of claim 10 wherein said first snapshot is of a legacy database and said second snapshot is of a converted database.

* * * * *

UNITED STATES PATENT AND TRADEMARK OFFICE
CERTIFICATE OF CORRECTION

PATENT NO.      : 6,553,388 B1
DATED           : April 22, 2003
INVENTOR(S)     : Perks It is certified that error appears in the above-identified patent and that said Letters Patent is hereby corrected as shown below:

Column 5,
Line 65, "be" should be -- the --

Column 7,
Line 6, "key the" should be -- key in the --

Signed and Sealed this

Tenth Day of June, 2003

JAMES E. ROGAN
*Director of the United States Patent and Trademark Office*